May 25, 1943.  E. S. CLANTON  2,319,847

NON SLIP HOLDER FOR CAKE SOAP

Filed Sept. 27, 1941

INVENTOR
Earl S. Clanton
BY
ATTYS

Patented May 25, 1943

2,319,847

UNITED STATES PATENT OFFICE 2,319,847

NONSLIP HOLDER FOR CAKE SOAP

Earl S. Clanton, Fresno, Calif.

Application September 27, 1941, Serial No. 412,666

1 Claim. (Cl. 45—28)

This invention relates in general to a household or domestic article, and in particular the invention is directed to a holder for cake soap.

The principal object of the invention is to provide a holder for cake soap which is designed to prevent slipping of the cake when wet from the hands of a user; the holder being in the form of a flexible envelope or cage, being relatively thin and having a relatively wide or large mesh to permit the escape of dissolved soap.

A further object of the invention is to provide a nonslip holder for cake soap which is of flexible and resilient material and of a size and configuration to frictionally engage about a cake of soap; such envelope having an opening formed in one end thereof and of a size smaller than but substantially symmetrical to the end of the cake of soap which the holder is adapted to encompass, whereby said cake may be inserted through said opening and the material about the opening may be stretched to permit entry of the cake of soap into the holder.

A further object of the invention is to provide a nonslip holder for cake soap which includes finger loops through which certain fingers of the user may be projected in order to assure that the cake of soap and its holder will not escape from such person's hands.

Another object of the invention is to provide a nonslip holder for cake soap, which comprises a mesh envelope or cage of a size and configuration to surround a cake of soap, said cage having an opening in one side thereof to permit passage of the cake into the cage, and said opening normally being closed by a small rust-proof endless slide fastener.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
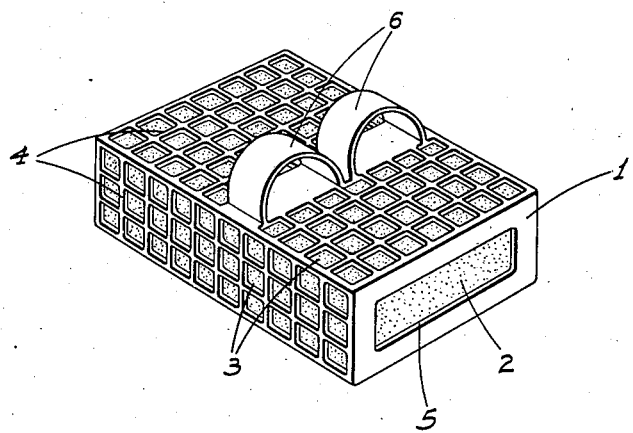
Figure 1 is a perspective view of one form of the invention.

Referring now more particularly to the characters of reference on the drawing, and at present to the embodiment shown in Fig. 1, the nonslip holder for a cake of soap comprises an envelope or cage 1 of a size and configuration to engage about or encompass a cake of soap 2. In the present instance such cage is shown as being rectangular and relatively shallow to fit a standard size cake of toilet soap. The cage, as above, is constructed of a flexible and resilient material, such as rubber, and preferably would be molded in one piece. Both faces of the cage, as well as the sides thereof, are of mesh design, the mesh openings 3 being relatively large and the webbing 4 therebetween quite narrow.

At one end the cage is formed with an elongated or slot opening 5, such slot being of a size and configuration symmetrical to but smaller than the end of the cake of soap which the cage is adapted to receive, so that the cake, after being passed into the cage through such slot by stretching the material about the slot, cannot accidentally escape.

On one face of the cage and intermediate the ends thereof there is provided a pair of upstanding finger loops 6 disposed in side by side relation and through which the user may project certain fingers to further assure that the cage and its contents will not drop from the hand while in use.

Figure 2:
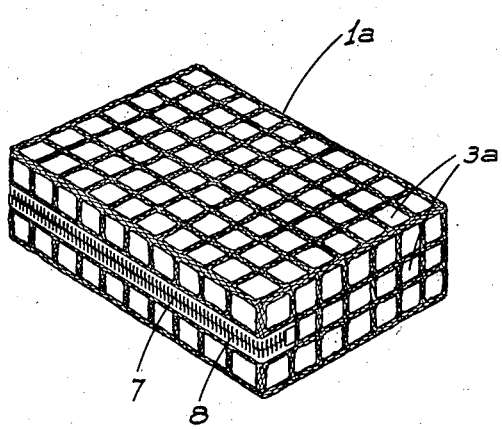
Figure 2 is a perspective view of another form of the invention.

In the embodiment shown in Fig. 2, the cage 1a is of similar size and configuration to that above described, except that here the mesh openings 3a are formed not only on the faces and sides of the cage, but also on the ends, which have no opening for entry of the cake of soap. The cake of soap is passed into this form of cage through a longitudinal slit 7 which extends from end to end of the cage along one side thereof and a short distance into said ends; such slit normally being closed by a small rust-proof slide fastener 8.

While a slide fastener is preferred, a snap button and tab or the like might be employed for the purpose of preventing separation at the slit.

In the embodiment shown in Fig. 2 the cage is constructed of a fiber as shown, and preferably a cotton fiber, which is quite soft.

In use it will be obvious that the mesh envelope or cage surrounding the cake of soap provides a relatively rough surface which prevents the cake of soap from slipping from the hands of the user.

For the purpose of ornamentation the cage, in either embodiment, may be of different colors or combination of colors, as may be desired.

Another advantage of the article is that when a full cake of soap is inserted in the holder, small and unused pieces of soap may also be placed in the cage; the cage holding such small pieces with the large cake until the pieces are consumed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A nonslip holder for cake soap comprising an openwork cage of flexible and resilient material of a size and configuration to snugly and symmetrically surround a cake of soap when new, the cage having an opening in one end of a normal size somewhat smaller than the cross-sectional area of such cake of soap, and a finger engaging loop on the cage extending lengthwise thereof and in such position relative to said one end of the cage as to enable the palm of the hand, one of whose fingers is engaged with the loop, to close the cage opening and prevent possible escape of the soap therethrough when the soap cake is diminished in size from use.

EARL S. CLANTON.